United States Patent [19]

Jordan

[11] Patent Number: 5,427,615
[45] Date of Patent: Jun. 27, 1995

[54] PROCESS FOR MAKING A GELLED INK VEHICLE FOR HEATSET PRINTING

[75] Inventor: Thomas C. Jordan, Century, Fla.

[73] Assignee: Arizona Chemical Company, Panama City, Fla.

[21] Appl. No.: 109,686

[22] Filed: Aug. 20, 1993

[51] Int. Cl.⁶ .............................................. C08L 93/00
[52] U.S. Cl. .................................... 106/222; 106/218; 106/219; 106/220; 106/236; 106/237; 530/210
[58] Field of Search ............... 106/218, 220, 222, 219, 106/236, 237; 530/210

[56] References Cited

U.S. PATENT DOCUMENTS

| | | | |
|---|---|---|---|
| 2,111,802 | 3/1938 | Oswald et al. | 134/26 |
| 2,283,353 | 5/1942 | Clare | 523/307 |
| 2,401,898 | 6/1946 | Bernstein | 106/30 R |
| 2,417,327 | 3/1947 | Scott | 106/222 |
| 2,608,541 | 8/1952 | Troyan et al. | 524/274 |
| 2,615,854 | 10/1952 | Pantin et al. | 524/270 |
| 3,804,640 | 4/1974 | Buckwalter | 106/27 |
| 3,881,942 | 5/1975 | Buckwalter | 106/22 |
| 4,075,143 | 2/1978 | Schelhaas et al. | 106/30 R |
| 4,248,746 | 2/1981 | Greiner | 106/20 C |
| 4,253,397 | 3/1981 | Emmons et al. | 101/450.1 |
| 4,398,016 | 8/1983 | Homma et al. | 528/158.5 |
| 4,938,801 | 7/1990 | Yoshioka et al. | 106/27 |
| 5,026,754 | 6/1991 | Pavlin | 534/272 |
| 5,073,623 | 12/1991 | Prantl et al. | 530/210 |
| 5,082,497 | 1/1992 | LeVine | 106/30 |

FOREIGN PATENT DOCUMENTS 3-302303 10/1991 Japan .

*Primary Examiner*—Anthony Green
*Attorney, Agent, or Firm*—Luedeka, Neely & Graham

[57] ABSTRACT

A process for producing a gelled ink vehicle for heatset printing including the sequential steps of first mixing a modified rosin ester and a liquid alkyd resin and a fatty acid ester solvent, reserving some of the solvent for later use, which is then heated and stirred until the modified rosin ester is dissolved. A gellant is optionally added, and the reaction mixture is maintained at temperature. A non-optional first gellant is then added to the reaction mixture. The reaction is allowed to progress, after which the balance of the solvent, which was withheld previously, is added. The vehicle is recovered from the reaction vessel. The process produces a vehicle that has a stronger gel structure than traditional ink vehicle gels.

24 Claims, No Drawings

PROCESS FOR MAKING A GELLED INK VEHICLE FOR HEATSET PRINTING

FIELD OF THE INVENTION

This invention relates to the process for making a gelled ink vehicle for use with lithographic printing inks.

BACKGROUND OF THE INVENTION

Gelled ink vehicles are used in lithography printing ink applications. In order to function properly, the vehicle must have a gelatinous texture so that printing inks can be made from which will have low misting properties and will dry properly minimal energy applied. The gelatinous texture must be such that it is retained in the ink and does not break down when running on a high speed press. Such a vehicle, also known in the art as a varnish, is said to have a strong gel structure.

In order to provide the necessary strong gel structure, gellants are added to the ink vehicles. These gellants, such as aluminum diisopropoxide acetoacetic ester chelate (AIE-M) or oxyaluminum octoate (OAO), are added to the vehicle mix to provide for an increase in the viscosity and yield value of the vehicle, However, an excess of the gellant in the mix sometimes causes adverse side-effects in the lithographic printing process, addition, since gellants are the most expensive part of the vehicle composition, excess gellant leads to increased cost of production.

Recently, manufacturers of ink vehicles have started using so,vents from renewable resources which contribute significantly lower levels of volatile organic compounds (VOC) ink, such as various fatty acids esterified with alcohols and glycols. Such so,vents are being used as replacements for the volatile non-renewable petroleum distillates. The fatty acid ester solvents have greater solvation power over the high molecular weight resins commonly used to prepare gelled ink vehicles and the hydrotreated petroleum distillates previously used. Such increased solvency power tends to increase the difficulty in producing the desired strong gel structure while using minimal amounts of gellants.

For the foregoing reasons, there is a continual need for an ink vehicle with a strong gel structure and low VOC using renewable resources as solvents. The ink product must have low misting and good drying without excess use of energy.

It is an object of the invention to provide such a vehicle using solvents derived from renewable resources.

It is a further object to provide an ink vehicle with a strong gel structure without the use of excess gellants.

SUMMARY OF THE INVENTION

The present invention is directed to a process for preparing a vehicle that satisfies this need for low VOC and a strong gel structure, using minimal amounts of gellants, while being produced from materials derived from renewable resources.

A process having the features of the present invention comprises the following sequential steps. A reaction mixture is prepared from a modified rosin ester and a liquid alkyd resin. The relative amounts of the two compounds are chosen such that the reaction mixture contains between about 80 and 95 percent, as measured by the total weight of this reaction mixture, of the modified rosin ester.

Rosin esters are derived from the condensation of rosin with monohydric, dihydric and polyhydric alcohols (e.g., pentaerythritol). Rosin is derived from pine trees (chiefly *Pinus palustris* and *Pinus elliottii*). Gum rosin is the residue obtained after the distillation of turpentine oil from the oleoresin tapped from living trees. Wood rosin is obtained by extracting pine stumps with naphtha and distilling off the volatile fraction. Tall oil rosin is a co-product of the fractionation of tall oil. The principle constituents of rosin are rosin acids of the abietic and pimaric types. The acids usually have the general formula $C_{19}H_{29}COOH$ with a phenanthrene nucleus. The esters are further modified by treatment with acids (e.g., maleic anhydride) or phenol-formaldehyde. In general, resins of the present invention have high molecular weights, low aliphatic solubility and fairly high viscosity.

Alkyd resins are conventionally made by condensation and the polymerization of dihydric or polyhydric alcohol (e.g., ethylene glycol or glycerol) with a polybasic acid (e.g., phthalic anhydride). Usually, a fatty acid or ester derived oil modifier is added to the reaction mix. More recently, a new class of alkyd resins are made by an epoxy addition polymerization in which a mixture of glycidyl esters and organic acid anhydrides are heated with a metal catalyst.

An amount of a fatty acid ester solvent is weighed out, with the amount being equal to between about 60 and 90 percent of the weight of the original reaction mixture. Between about 50 and 90 percent of the weighed amount of fatty acid ester solvent is added to the reaction mixture, with the remainder of the fatty acid ester solvent being reserved for later addition.

The reaction is heated and stirred until all of the rosin ester is dissolved in the alkyd resin and fatty acid ester solvent. Next, a gellant, diluted to 50% in a solvent, is slowly added to the mixture. Dilution of the gellant is to prevent localized "hot spots" in the reaction mixture which may cause gel seeds or lumps. The gellant solvent is generally a monoester of a tall oil fatty acid (e.g., the butylester of tall oil fatty acid). Between about 1 and 8 percent of the gellant solution is used, again based on the weight of the original reaction mixture.

The mixture is heated at a temperature between about 125° C. and 200° C., for between about 10 and 60 minutes. Then the reserved fatty acid ester solvent, that solvent that was not originally added to the mixture, is slowly added. The mixture is stirred while the fatty acid ester solvent is added. The gelled ink vehicle can then be recovered from the reaction vessel.

Optionally, a second gellant, dissolved in a solution of 50 percent solvent, can be added to the reaction mixture after the rosin ester is dissolved in the alkyd resin and fatty acid ester solvents and before the addition of the first gellant. Between about 1.5 and 2.5 percent of the second gellant solution is used, again based on the weight of the original reaction mixture. The mixture is heated at a temperature between about 150° C. and 200° C., for between about 20 and 40 minutes. Then the process continues with the addition of the first gellant as described above.

The process described creates a vehicle that has stronger gel structure and so will produce low misting inks that dry on heatset presses better than vehicles produced by traditional processes.

These and other features, aspects, and advantages of the present invention will become better understood with reference to the following description and appended claims.

DETAILED DESCRIPTION OF THE INVENTION

A process according to the present invention for making a gelled ink vehicle for heatset printing comprises the steps of mixing the initial reagents with a fatty acid ester solvent optionally adding a gellant solution, then adding another gellant solution. The amount of fatty acid ester solvent used, in the initial mix, is less than the amount that is traditionally used in the art. The reaction is allowed to progress for a period of time, after which the balance of the fatty acid ester solvent is added, and the ink vehicle is recovered.

The initial reaction mixture is prepared in a glass reaction vessel, or other appropriate vessel. The initial reaction mixture comprises a maleic- or phenol-modified rosin ester and an alkyd resin. Suitable modified rosin esters include, for example, BECKACITE 4520, BECKACITE 6000 (Arizona Chemical Company) or combinations of the resins, or any resins traditionally used to meet specific requirements of the ink vehicle. Examples of suitable liquid alkyd resins include those derived from linseed, soya, or tall oils. A typical tall oil derived alkyd resin is designated S-84 (Bergvik Kemi AB) which has a No. 3 body. The vehicle formulation may also contain a modified vegetable oil in addition to or in place of the alkyd resin.

The relative amounts of the two compounds are chosen such that the reaction mixture contains between about 80 and 95 percent, and preferably between 84 and 92 percent, as measured by the weight of this original reaction mixture, of the modified rosin ester with the remainder comprising the liquid alkyd resin. Between about 30 and 90 weight percent, based on the original reaction mixture, and preferably between about 75 and 81 weight percent of a fatty acid ester solvent is weighed out. Between about 50 and 90 percent, preferably between about 65 and 75 percent, of the weight fatty acid ester solvent is added to the reaction mixture with the remainder being reserved for later addition. The solvent is selected from those esters of fatty acids where the fatty acid has between 8 and 24 carbon atoms and the fatty acid is esterified with an alcohol or glycol having from 1 to 10 carbon atoms. A typical solvent is a butyl ester of tall oil fatty acids, such as NIREZ 9012 (Arizona Chemical Company). The reaction mixture is brought to a temperature of between about 125° C. and 200° C., and preferably between 165° C. and 175° C., and stirred until all of the rosin ester is dissolved in the liquid alkyd resin and fatty acid ester solvent, which will typically require between about 15 and 30 minutes.

In an optional step, a gellant, in a 50 percent solvent solution, is added to the mixture. Between about 1 and 3 percent, based on the weight of the original reaction mixture, of the gellant solution is used. The gellant is selected from the group consisting of organo-aluminum compounds such as chelated alkoxides and especially aluminum diisopropoxide acetoacetic ester chelate (AIE-M). The diluting solvent for the gellant is any one of a number of solvents traditionally used in the ink vehicle art to dilute gellants, but esters of tall oil fatty acids are especially preferred. An example of such a solvent is a butyl ester of tall oil fatty acid, such as NIREZ 9012 (Arizona Chemical Company). It is preferred to prepare the gellant solution just prior to use in order to prevent increased viscosity and degradation of gellant properties. The reaction mixture with the added gellant solution is maintained at a temperature of between about 125° C. and 200° C., and preferably between 150° C. and 175° C., for a period of time of between about 20 and 40 minutes, and preferably between 25 and 35 minutes. Care should be taken to deal effectively with the vapors evolved in this reaction.

In the next step, a non-optional gellant, in a 50% solution of solvent is added to the reaction mixture. Between about 1 and 8 percent of the gellant solution is used, again based on the weight of the original reaction mixture. When the optional gellant is used, it is preferred to use between about 3.6 and 3.8 weight percent of the non-optional gellant solution. When the optional gellant is not used, it is preferred to use between about 5.25 and 5.50 percent of the non-optional gellant solution.

There are many organo aluminum compounds (i.e., gellants) used to control the rheology (i.e., flow characteristics) in ink vehicles. It is recognized by those skilled in the art that any such compound which is capable of reacting covalently with carboxyl(-COOH) or hydroxyl (-OH) groups in the resin system may be used. It is preferred that the non-optional gellant is an organo-aluminum compound such as oxyaluminum acylates, such as oxyaluminum octoate (OAO).

The reaction mixture with the non-optional gellant is heated at a temperature of between about 150° C. and 155° C. for between about 10 and 60 minutes and preferably between about 25 and 35 minutes. Then, the reserved fatty acid ester solvent is added while being heated and stirred for an additional amount of time such that the total heating time after addition of the non-optional gellant is between about 30 and 70 minutes, preferably 55 and 65 minutes. The gelled ink vehicle is then recovered.

In order to facilitate a further understanding of the invention, the following Examples are given primarily for purposes of illustrating certain more specific details hereof.

EXAMPLE I

A control ink vehicle was prepared using a traditional process with the following formulation:

| | |
|---|---|
| 75.00 g | modified rosin ester |
| 11.25 g | alkyd |
| 1.50 g | optional gellant solution |
| 3.25 g | non-optional gellant solution |
| 68.25 g | fatty acid ester solvent |

The modified rosin ester(BECKACITE 6000, Arizona Chemicals), alkyd (S-84, Bergvik Kemi AB) and fatty acid ester solvent (NIREZ 9012, Arizona Chemical Company) were weighed into a 500 ml three-necked flask fitted with a stirrer, and a temperature measuring device. The flask was heated with a heating mantle and nitrogen was continuously bled into the flask at a rate of about 3.3 ml/minute. The flask was heated to 170° C. with stirring until all of the rosin ester was dissolved in the alkyd and solvent. The optional gellant solution (AIE-M, Chattem Chemicals, 50% solution in NIREZ 9012, Arizona Chemical Company) was added at 170° C. after which the temperature was allowed to decrease to 150° C. After 30 minutes of reaction, the non-optional gellant (OAO, Rhone-Poulenc, 50% solution in NIREZ 9012, Arizona Chemical Company) was added with vigorous agitation. After 60 minutes of reaction, the vehicle was removed from the flask. The vehicle was very near being pourable. Additional physical characteristics are listed in Table I.

EXAMPLE II

An ink vehicle according to the present invention was prepared with the following formulation:

| | |
|---|---|
| 75.00 g | modified rosin ester |
| 11.25 g | alkyd |
| 1.50 g | optional gellant solution |
| 3.25 g | non-optional gellant solution |
| 68.25 g | fatty acid ester solvent |

The modified rosin ester (BECKACITE 6000, Arizona Chemical Company), alkyd (S-84, Bergvik Kemi AB), and 50 g of the fatty acid ester solvent (NIREZ 9012, Arizona Chemical Company) were weighed into a 500 ml three-necked flask fitted with a stirrer, and a temperature measuring device. The flask was heated with a heating mantle and nitrogen was continuously bled into the flask at a rate of about 3.3 ml/minute. The flask was heated to 170° C. with stirring until all of the rosin ester was dissolved in the alkyd and solvent. The optional gellant solution (AIE-M, Chattem Chemicals, 50% solution in NIREZ 9012, Arizona Chemical Company) was added at 170° C. after which the temperature was allowed to decrease to 150° C. After 30 minutes of reaction, the non-optional gellant (OAO, Rhone-Poulenc, 50% solution in NIREZ 9012, Arizona Chemical Company) was added with vigorous agitation. After 30 minutes of reaction, the reserved fatty acid ester solvent was added to the reaction mixture with agitation. The reaction was allowed to continue for an additional 30 minutes, after which, the vehicle was removed from the flask. The vehicle was a heavy gel and pressurization of the flask was required to remove the gel from the flask. Additional physical characteristics are listed in Table I.

EXAMPLE III

A control ink vehicle was prepared using a traditional process with the following formulation:

| | |
|---|---|
| 37.50 g | phenol modified rosin ester |
| 37.50 g | maleic modified rosin ester |
| 7.50 g | alkyd |
| 4.50 g | gellant solution |
| 63.00 g | fatty acid ester solvent |

The phenol modified rosin ester (BECKACITE 6000, Arizona Chemical Company), maleic modified resin ester (BECKACITE 4520, Arizona Chemical Company), alkyd (S-84, Bergvik Kemi AB), and fatty acid ester solvent (NIREZ 9012, Arizona Chemical Company) were weighed into a 500 ml three-necked flask fitted with a stirrer, and a temperature measuring device. The flask was heated with a heating mantle and nitrogen was continuously bled into the flask at a rate of about 3.3 ml/minute. The flask was heated to 170° C. with stirring until all of the rosin ester was dissolved in the alkyd and solvent. The temperature was lowered to 150° C. Then the gellant solution (OAO, Rhone-Poulenc, 50% solution in NIREZ 9012, Arizona Chemical Company) was added with vigorous agitation. After 60 minutes of reaction, the vehicle was removed from the flask. Additional physical characteristics are listed in Table I.

EXAMPLE IV

An ink vehicle according to the present invention was prepared with the following formulation:

| | |
|---|---|
| 37.50 g | phenol modified rosin ester |
| 37.50 g | maleic modified rosin ester |
| 7.50 g | alkyd |
| 4.50 g | gellant solution |
| 63.00 g | fatty acid ester solvent |

The phenol modified rosin ester (BECKACITE 6000, Arizona Chemical Company), maleic modified resin ester (BECKACITE 4520, Arizona Chemical Company), alkyd (S-84, Bergvik Kemi AB), and 43.5 g of the fatty acid ester solvent (NIREZ 9012, Arizona Chemical Company) were weighed into a 500 ml three-necked flask fitted with a stirrer, and a temperature measuring device. The flask was heated with a heating mantle and nitrogen was continuously bled into the flask at a rate of about 3.3 ml/minute. The flask was heated to 170° C. with stirring until all of the rosin ester was dissolved in the alkyd and solvent. The temperature was lowered to 150° C. Then, the gellant solution (OAO, Rhone-Poulenc, 50% solution in NIREZ 9012, Arizona Chemical Company) was added with vigorous agitation. After 30 minutes of reaction, the reserved fatty acid ester solvent was added to the reaction mixture with agitation. The reaction was allowed to continue for an additional 30 minutes, after which, the vehicle was removed from the flask. Additional physical characteristics are listed in Table I.

TABLE I

| Vehicle (Example) | I | II | III | IV |
|---|---|---|---|---|
| Laray viscosity (poise) | 519 | 562 | 569 | 532 |
| Yield value (dynes/cm$^2$) | 6925 | 9117 | 8897 | 11766 |
| Shortness ratio (yield/viscosity) | 13.1 | 16.2 | 15.6 | 22.1 |
| Slope | 1.32 | 1.37 | 1.36 | 1.46 |
| MAGIESOL 47 tolerance (ml/10 g)[a] | 13.5 | 12.5 | 17.0 | 16.0 |

[a]10 g of vehicle titrated to cloud point with MAGIESOL 47; MAGIESOL 47 is a solvent used in ink making and is a trademark of Magie Brothers Oil Company, a division of Pennzoil Corporation.

a. 10 g of vehicle titrated to cloud point with MAGIESOL 47; MAGIESOL 47 is a solvent used in ink making and is a trademark of Magie Brothers Oil Company, a division of Pennzoil Corporation.

A comparison of the ink vehicles shows that the vehicles prepared according to the present invention (Examples II and IV) have better rheology and much higher yield values than the vehicles prepared according to traditional methods (Examples I and III). Thus, vehicle prepared according to the present invention has a stronger gel structure than those produced by traditional methods.

A comparison of the two ink vehicles shows that the vehicle prepared according to the present invention has a better rheology and much higher yield value than the vehicle prepared according to traditional methods. Thus, a low VOC vehicle prepared according to the present invention has a stronger gel structure than those prepared by traditional methods.

The appended claims set forth various novel and useful features of the invention.

What is claimed is:

1. A process for producing a gelled ink vehicle for preparing an ink for heatset or other lithographic printing, the process comprising the steps of:
   (A) preparing a reaction mixture comprising from about 80 to about 95 weight percent modified rosin ester and from about 5 to about 20 weight percent liquid alkyd resin;
   (B) adding to the reaction mixture of step (A) from about 15 to about 80 weight percent, based on the weight of the reaction mixture, of a fatty acid ester solvent;
   (C) heating and stirring the reaction mixture of step (B) at a temperature of from about 125° C. to about 200° C. for from about 15 to about 30 minutes or until the materials are substantially dissolved in one another to provide a mixture;
   (D) adding with stirring from about 1 to about 6 weight percent, based on the weight of the reaction mixture of step (A), of a gellant solution;
   (E) heating the mixture of step (D) for from about 10 minutes to about 60 minutes at a temperature of from about 125° C. to about 200° C.;
   (F) adding with stirring a fatty acid ester to the heated mixture of step (E) such that the total fatty acid ester solvent added to the reaction mixture of step (A) is in the range of from about 30 to about 90 weight percent based on the total weight of the reaction mixture, and heating the resulting mixture wherein there is provided a gelled ink vehicle;
   (G) recovering the gelled ink vehicle of step (F).

2. The process of claim 1 further comprising, after step (C) and before step (D), the sequential steps of:
   (1) adding with stirring from about 1 to about 3 weight percent, based on the weight of the reaction mixture of step (A), of a second gellant solution to the reaction mixture; and
   (2) heating the reaction mixture of step 1 for from about 20 to about 40 minutes at a temperature of from about 150° C. to about 200° C.

3. The process of claim 1 wherein between about 3.6 weight percent and about 3.8 weight percent of the gellant in a 50% solution is added to the mixture in step (D).

4. The process of claim 1 wherein the modified rosin ester is selected from the group consisting of maleic-modified rosin ester and phenol-modified rosin ester.

5. The process of claim 1 wherein the reaction mixture prepared in step (A) includes between about 84 weight percent and about 92 weight percent of the modified rosin ester and between about 16 weight percent and about 8 weight percent of the liquid alkyd resin.

6. The process of claim 1 wherein the liquid alkyd resin is selected from the group consisting of linseed, soya, and tall oil alkyds.

7. The process of claim 1 wherein the gellant is an organo-aluminum compound.

8. The process of claim 1 wherein the gellant is an aluminum compound.

9. The process of claim 8 wherein the gellant is oxyaluminum octoate.

10. The process of claim 1 wherein the fatty acid ester solvent is a product of the esterification of a fatty acid having from 8 to 24 carbon atoms and an alcohol or glycol having from 1 to 10 carbon atoms.

11. The process of claim 10 wherein the fatty acid is derived from an oil selected from the group consisting of tall oil, linseed oil, soybean oil, and rape seed oil.

12. The process of claim 1 wherein, in step (B), between about 20 and 65 percent of fatty acid ester solvent is added.

13. The process of claim 1 wherein step (C) is carried out at a temperature of between about 165° C. and 175° C.

14. The process of claim 1 wherein between about 5.0 and about 5.5 percent, based on the weight of the reaction mixture, of the gellant in a 50% solution is added to the reaction mixture in step (D).

15. The process of claim 1 wherein step (E) is carried out at a temperature of from about 145° C. and 175° C.

16. The process of claim 1 wherein step (F) is carried out at a temperature of from about 145° C. and 175° C.

17. A gelled ink vehicle for preparing an ink for heatset or other lithographic printing prepared according to the process of claim 1.

18. The gelled ink vehicle of claim 17 wherein the fatty acid ester solvent is a butyl ester of tall oil fatty acid and the gellant solution employed to make the vehicle is oxyaluminum octoate in a butyl ester of tall oil fatty acid.

19. A gelled ink vehicle for preparing an ink for heatset or other lithographic printing prepared according to the process of claim 2.

20. The gelled ink vehicle of claim 19 wherein the fatty acid ester solvent is a butyl ester of tall oil fatty acid, the gellant solution is oxyaluminum octoate in a butyl ester of tall oil fatty acid and the second gellant solution is aluminum diisopropoxide acetoacetic ester chelate in a butyl ester of tall oil fatty acid.

21. A process for producing a gelled ink vehicle for preparing an ink for heatset or other lithographic printing, the process comprising the sequential steps of:
   (A) preparing a reaction mixture including in the range of from about 84 weight percent to about 88 weight percent of a modified rosin ester selected from the group consisting of maleic-modified rosin ester and phenol-modified rosin ester and in the range of from about 16 weight percent to about 12 weight percent of a liquid alkyd resin selected from the group consisting of linseed, soya, and tall oil alkyd;
   (B) adding in the range of from about 15 weight percent to 80 weight percent, based on the weight of said reaction mixture of step (A), of a fatty acid ester solvent to said reaction mixture, wherein the fatty acid ester solvent is a product of the esterification of a fatty acid having from 8 to 24 carbon atoms and an alcohol or glycol having from 1 to 10 carbon atoms, and wherein the fatty acid is derived from an oil selected from the group consisting of linseed oil, soya oil, and rape seed oil;
   (C) heating and stirring the reaction mixture of step (B) at a temperature in the range of from about 165° C. to 175° C. for a period of time in the range of from about 15 minutes to 30 minutes or until components of the reaction mixture are substantially dissolved to provide a mixture;
   (D) adding to the mixture of step (C) with stirring in the range of from about 1.5 weight percent to about 2.0 weight percent, based on the weight of said reaction mixture of step (A), of a first organoaluminum gellant in a solvent solution; and (E) heating the mixture of step (D) for a period of time in the range of from about 20 minutes to about 40 minutes at a temperature in the range of from about 145° C. to 175° C.

(F) adding to the mixture of step (E) with stirring in the range of from about 3.5 weight percent to about 4.0 weight percent, based on the weight of said reaction mixture of step (A), of a second organo-aluminum gellant in a solvent solution;

(G) heating the mixture of step (F) for a period of time in the range of from about 30 minutes to about 60 minutes at a temperature in the range of from about 145° C. to 155° C.;

(H) adding to the mixture of step (G) with stirring in the range of from about 15 weight percent to about 25 weight percent, based on the weight of said reaction mixture of step (A), of a fatty acid ester solvent;

(I) heating the mixture of step (H) at a temperature in the range of from about 125° C. to about 200° C. for a period in the range of from about 5 minutes to about 45 minutes such that the total amount of heating after step (F) is in the range of from about 35 minutes to 75 minutes wherein there is provided a gelled ink vehicle; and (J) recovering the gelled ink vehicle of step (I).

22. The process of claim 21 wherein the fatty acid ester solvent is a butyl ester of tall oil fatty acid, the first gellant solution is aluminum diisopropoxide acetoacetic ester chelate in a butyl ester of tall oil fatty acid and the second gellant solution is oxyaluminum octoate in a butyl ester of tall oil fatty acid.

23. The process of claim 21, wherein the fatty acid ester solvents added in steps (B) and (H) are of substantially the same composition.

24. A gelled ink vehicle prepared by the process of claim 21.

* * * * *

UNITED STATES PATENT AND TRADEMARK OFFICE
CERTIFICATE OF CORRECTION

PATENT NO. : 5,427,615

DATED : June 27, 1995

INVENTOR(S) : Thomas C. Jordan

It is certified that error appears in the above-indentified patent and that said Letters Patent is hereby corrected as shown below:

Column 1, line 33, delete "so,vents" and insert
-- solvents --.

Column 1, line 36, delete "so,vents" and insert
-- solvents --.

Column 6, line 51, delete "a. 10 g of vehicle titrated to cloud point with MAGIESOL 47; MAGIESOL 47 is a solvent used in ink making and is a trademark of Magie Brothers Oil Company, a division of Pennzoil Corporation."

Column 7, line 20, delete "the materials" and insert
-- components of the reaction mixture --.

Signed and Sealed this

Third Day of October, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,427,615

DATED : June 27, 1995

INVENTOR(S) : Thomas C. Jordan

It is certified that error appears in the above-indentified patent and that said Letters Patent is hereby corrected as shown below:

Column 1, line 15, between "from" and "which" insert -- it --.

Column 1, line 16, between "properly" and "minimal" insert -- with --.

Column 1, line 28, after "process" insert --. In--.

Column 1, line 35, between "(VOC)" and "ink" insert -- to --.

Column 1, line 41, delete "and" and insert -- than --.

Signed and Sealed this

Twenty-first Day of November, 1995

Attest:

BRUCE LEHMAN

Attesting Officer

Commissioner of Patents and Trademarks